United States Patent
Jones

[15] 3,668,702
[45] June 6, 1972

[54] ADAPTIVE MATCHED FILTER FOR RADAR SIGNAL DETECTOR IN THE PRESENCE OF COLORED NOISE

[72] Inventor: James W. Jones, Granada Hills, Calif.
[73] Assignee: International Telephone and Telegraph Corporation, New York, N.Y.
[22] Filed: Oct. 30, 1970
[21] Appl. No.: 85,426

[52] U.S. Cl. .......................... 343/5 R, 324/77 E, 343/17.1 R
[51] Int. Cl. .......................................................... G01s 9/02
[58] Field of Search .................... 343/5 R, 17.1 R; 324/77 E, 324/77 G, 77 J

[56] References Cited

UNITED STATES PATENTS 3,509,280  4/1970  Jones ................................... 179/1 SB
3,167,738  1/1965  Westerfield .......................... 324/77 E
3,374,478  3/1968  Blau ..................................... 343/5 R Primary Examiner—Malcolm F. Hubler
Attorney—C. Cornell Remsen, Jr., Walter J. Baum, Paul W. Hemminger, Charles L. Johnson, Jr. and Thomas E. Kristofferson

[57] ABSTRACT

A system for electromagnetic signal detection having an adaptive circuit generating a time-varying matched filter characteristic whereby the statistical properties of additive noise appearing in a receiver output may be "tracked." The statistical behavior of "colored" noise is evaluated and the matched detection filter characteristics are modified accordingly, so that detector performance for signals in "colored" noise is comparable to that achieved by an optimum invariant matched filter for signal detection in "white" noise.

7 Claims, 8 Drawing Figures

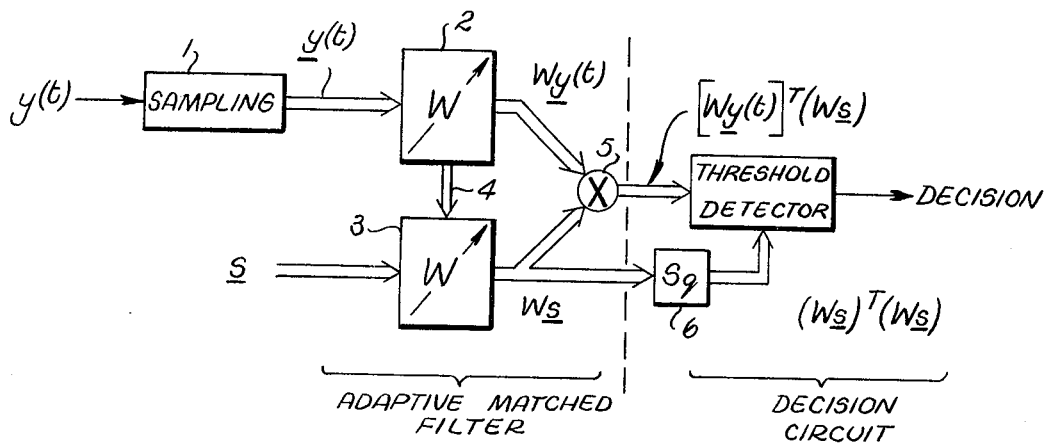
Fig. 1. System Block Diagram.
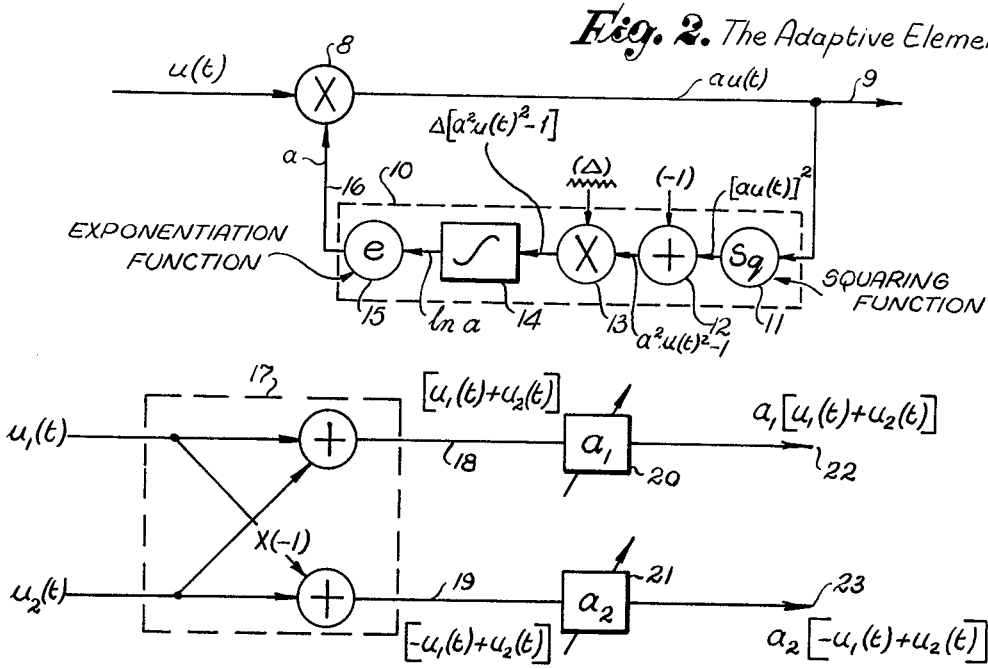
Fig. 2. The Adaptive Element
Fig. 3. The Pairwise Adaptive Transformation.
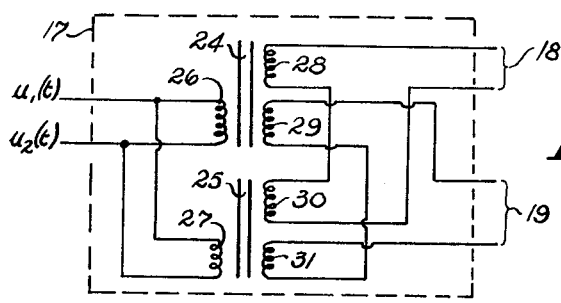
Fig. 3a.
INVENTOR.
JAMES W. JONES
BY
William F. O'Neil
AGENT

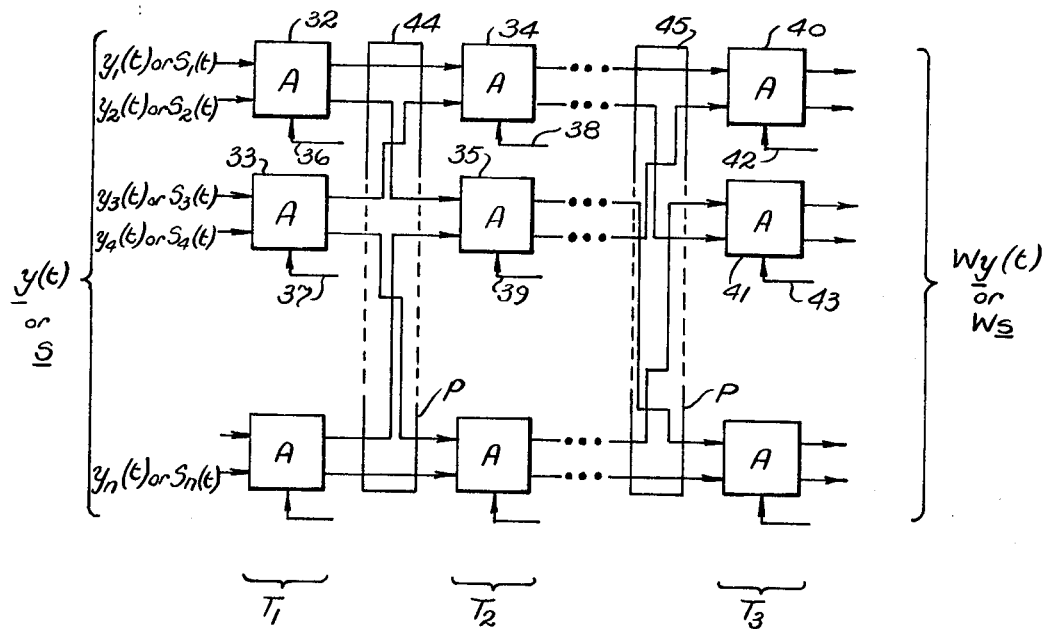
Fig. 4. The Adaptive Whitening Filter
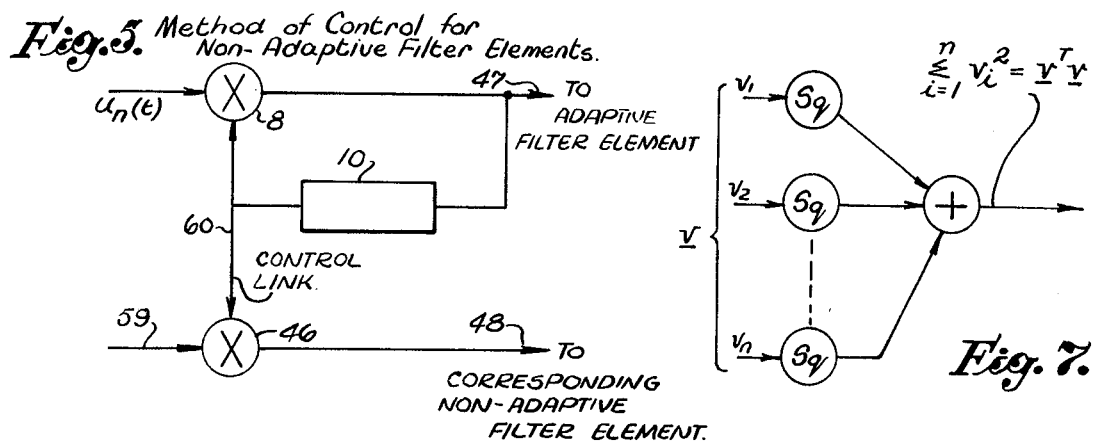
Fig. 5. Method of Control for Non-Adaptive Filter Elements.
Fig. 7.
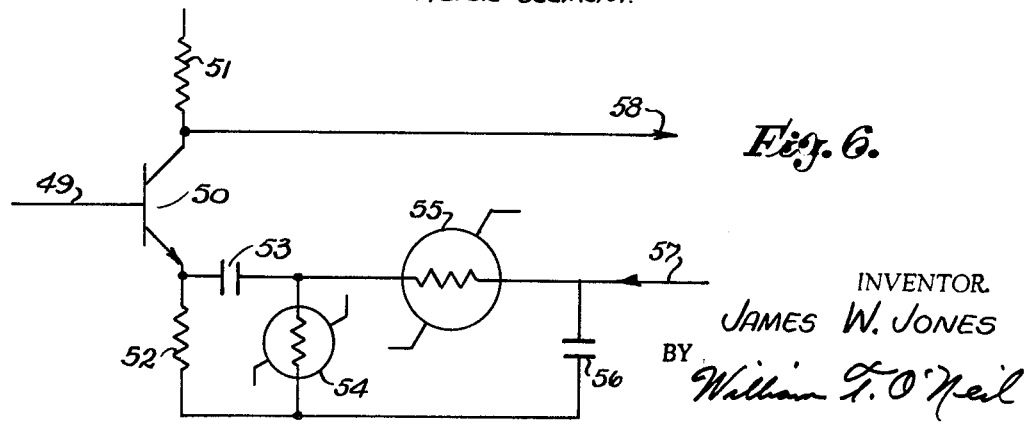
Fig. 6.
INVENTOR.
JAMES W. JONES
BY William F. O'Neil
AGENT

# 3,668,702

ADAPTIVE MATCHED FILTER FOR RADAR SIGNAL DETECTOR IN THE PRESENCE OF COLORED NOISE

BACKGROUND OF THE INVENTION

1. Field of the Invention

The invention relates to detection of radar or other pulsed signals in noise.

2. Description of the Prior Art

The description of the present invention presumes basic knowledge of information theory as it applies to signal detection, the theory of the general art in which the present invention resides.

The optimum pulsed radar signal detection process and instrumentation is conventionally regarded as a matched filter whose impulse response is the reverse of the transmitted signal. This form of matched filter is described in the textbook "Introduction to Radar Systems" by Merrill I. Skolnik, published by McGraw-Hill Book Co. of New York, N.Y. (1962). In particular, Chapter 9 of that text extensively describes prior art invariant "optimum" matched filter detection.

It is known, however, that this type of matched filter is only optimum for the case where the additive noise is assumed to be, and is treated as, white noise (i.e., noise of uniform spectral density). It is possible to optimize such a filter for detection in non-white (colored) noise if the statistical characteristics of the noise can be determined. That match remains optimum only so long as it can be validly assumed that the particular noise spectral distribution remains stationary. In practice, this is usually a poor assumption because clutter is nearly always present in the additive noise. The clutter results from transitory environmental conditions such as weather and consequently exhibits statistical characteristics which change with time. The overall statistical noise characteristics thus vary with time.

From the foregoing, it will be evident that a time invariant matched filter cannot be optimum in the presence of a varying noise characteristic.

The manner in which the prior art problem thus set forth is solved by the present invention will be evident as this description proceeds.

Other prior art documents helpful in understanding the background of the present invention include the following:

1. "On Applied Decision Theory," Technical Report No. 2005-2 Stanford Electronics Laboratories, Stanford University, Palo Alto, California, September 1962.
2. U.S. Pat. No. 3,509,280 titled "Adaptive Speech Pattern Recognition System," James W. Jones, issued Nov. 1, 1968.
3. "Signal Detection Theory," a textbook by John C. Hancock and Paul A. Wintz, published 1966 by McGraw-Hill Book Company, New York, New York.

SUMMARY

In view of the shortcomings and inadequacies of the prior art as outlined above, it may be said to be the general object of the present invention to provide a novel matched filter system which will be time-varying in accordance with the continuously monitored and evaluated statistical characteristics of the noise. The system of the invention is both practical and relatively inexpensive. It also has some attractive reliability aspects which will be evident to the skilled reader as this description proceeds.

The present invention may be generally described as a decision system (detector) which first samples the input waveform $y(t)$ to produce a time-varying vector $y(t)$ representing the input waveform over an interval of its history. This vector is applied to the input of an adaptive whitening filter whose function is to convert the vector $\underline{y}(t)$ to a new vector representing white (uncorrelated) noise.

A second whitening filter is responsive to a vector $\underline{s}$ representing the waveform history of the transmitted pulse. This second whitening filter is slaved to the adaptive whitening filter, in that corresponding operational elements therein are controlled in open-loop fashion by the internally generated gain control signals of the adaptive whitening filter, so that the slaved whitening filter performs the same operation as the adaptive filter.

The adaptive and slaved whitening filter outputs are then $W\underline{y}(t)$ and $W\underline{s}$, respectively. These are in vector form and corresponding components of each are cross-multiplied and supplied in vector form to a threshold detector having a number of channels corresponding to the number of components in these vectors. The $W\underline{s}$ vector is squared to produce a reference or threshold control for the threshold detector and the vector product of the two whitening filters may then be evaluated against that reference. The manner in which these functions are accomplished will be evident from the description of the structure of the system and its sub-components to follow.

BRIEF DESCRIPTION OF THE DRAWINGS

FIG. 1 is an overall block diagram of a detection system in accordance with the present invention.

FIG. 2 is a diagram of the adaptive element within the Pairwise Adaptive Transformation Unit of FIG. 3.

FIG. 3 is a diagram of the Pairwise Adaptive Transformation, a plurality of which are used in the Adaptive Whitening Filter.

FIG. 3a is a detailed diagram of a possible instrumentation of a portion of FIG. 3.

FIG. 4 is a diagram of the Adaptive Whitening Filter which is a part of the FIG. 1 system.

FIG. 5 is a variation of FIG. 2 for use in the slaved whitening filter receiving the $\underline{s}$ signals representative of the predetermined signal characteristics.

FIG. 6 is a detailed diagram of a possible circuit for certain elements in the diagrams of FIGS. 2 and 6.

FIG. 7 is a diagram of the squaring device of FIG. 1.

DESCRIPTION OF THE PREFERRED EMBODIMENT

Before proceeding with a description of the instrumentation taken in conjunction with the drawings, some discussion of the theoretical basis of the present invention is considered appropriate.

A matched filter according to the present invention will be better than a conventional system of signal processing. In particular, it will function better in adverse conditions such as poor weather. We can assume that the more adverse the conditions, the more significant will be the improvement. This assumption can be justified on the basis of the following heuristic argument.

If we know the statistical behavior of a random process, we can form an estimate of the value of a sample function from this process over any given interval of time. In general, if the random process is stationary, then we are able to improve this estimate by observing values of the random process outside of this interval.

On the other hand, if the random process is specified as white noise, we should be unable to improve the estimate since the observed values are not correlated with those values to be estimated.

Now, suppose we are asked to test the hypothesis that an observed sample function $y(t)$, which contains additive noise $n(t)$, also contains a signal $s(t)$ of finite duration and known form. Assuming that the signal is limited to the time interval $(t_1, t_{2\ ay})$, and that the noise is specified as white noise, then it would be useless to observe $y(t)$ outside of the interval $(t_1, t_2)$. However, if the noise is colored noise, then from an observation of the sample function $y(t)$ taken outside of the interval $(t_1, t_{2\ ay})$, we can estimate the value of the additive noise sample function within this interval. We can then subtract this estimate from the value of $y(t)$ which has been observed and expect the resulting sample function to contain additive noise of reduced power. Thus, the signal to noise ratio can be improved by knowledge of the statistical behavior of the noise, and we should be able to detect a signal contained in this interval with a smaller probability of error than possible under the prior art.

The system of the present invention is based on a reasonably well known decision theoretic solution to the problem of signal detection. The theory of that approach is very clearly described by authors Abramson and Farison in their Stanford Electronics Laboratories publication hereinbefore identified. Accordingly, the assumptions and results relating to the present invention are presented below.

Briefly, the solution to be presented first assumes that the observed signal (the signal available at the output of the radar receiver), is bandwidth limited, so that the sampling theorem can be applied. The signal can then be represented by amplitude samples taken at the Nyquist rate. Over a finite interval of time corresponding to a range cell, the observed signal can be accurately represented by a finite set of values specified as a vector.

Next, let the observed signal $y(t)$ be represented as follows:
$$y(t) = x\, s(t) + n(t), \qquad \text{I}$$
where $s(t)$ is a signal of known form, $n(t)$ is a random process representing additive noise, and $x$ is a binary random variable. The value of $x$ is defined as zero if no target is present in the range cell under observation and one if a target is present.

By applying Shannon's stochastic sampling theorem to Equation I, it is possible to convert this equation to the vector equation:
$$\underline{y} = x\, \underline{s} + \underline{n}, \qquad \text{II}$$
where $\underline{y}$, $\underline{s}$, and $\underline{n}$ are the vectors representing $y(t)$, $s(t)$, and $n(t)$, respectively, over the appropriate time interval.

It is also assumed that the probability distribution of $\underline{n}$ is multivariate Gaussian. This assumption is restrictive, since it does not permit us to distinguish between two different stochastic processes which have the same first and second moments, but different higher order moments. On the other hand, the assumption is equivalent to the constraint that we only consider solutions leading to linear systems, and we can see that any assumption that is more general should lead to an intractable form of solution.

Finally, it is assumed that after the observation becomes known, a decision must be made regarding the presence or absence of the target. If the decision is correct, nothing is lost. However, if a target which is actually present is not detected, one unit is lost, and if a false alarm occurs, $r$ units are lost.

If the Bayes decision criterion is applied to this set of assumptions, the optimum decision rule can be specified in the form of an inequality, as follows:

It is decided that a target is present if, and only if,
$$\underline{y}^T \Sigma^{-1} \underline{s} \geq \tfrac{1}{2} \underline{s}^T \Sigma^{-1} \underline{s} + \ln[r(1-q)/q] \qquad \text{III}$$

In the above inequality, $\Sigma$ is defined as the covariance matrix of the noise vector $\underline{n}$ and $\Sigma^{-1}$ is its inverse and $q$ is defined as the a priori probability that a target is present.

If we assume that the noise is white noise, the covariance matrix $\Sigma$ reduces to a constant multiplied by the identity matrix. The constant represents the average noise power $p_0$. The inequality (Equation III) then reduces to the form,
$$\underline{y}^T \underline{s} \geq \tfrac{1}{2} \underline{s}^T \underline{s} + \tfrac{1}{p_0} \ln[r(1-q)/q] \qquad \text{IV}$$

The inner product on the left hand side of this equation represents the output of a matched filter in vector form. In fact, the value of this inner product is shown to be equal to the output of the corresponding matched filter described by Abramson and Farison in the hereinbefore referenced publication. The quantity on the right hand side of Equation IV is a constant representing an optimum threshold.

However, herein we are primarily interested in the case where the noise is colored. In that case, the covariance matrix $\Sigma$ would be an arbitrary form of covariance matrix. Accordingly, it is to be shown that Equation III can also be reduced to a form of matched filter by first applying a linear (matrix) transformation to the observation vector $\underline{y}$ and to the signal vector $\underline{s}$.

The particular form of linear transformation required is called a "whitening filter." This filter can be defined as follows:

Given a random vector $\underline{n}$ with covariance matrix $\Sigma$ defined as follows:
$$\Sigma = E\{\underline{n}\,\underline{n}^T\} \qquad \text{V}$$

If there exists a matrix $W$, such that for
$$\underline{v} = W\underline{n}, \qquad \text{VI}$$
it follows that
$$E\{\underline{v}\,\underline{v}^T\} = 1, \qquad \text{VII}$$
where 1 is the identity matrix and $W$ is then called a whitening filter.

It can be shown that at least one whitening filter must exist for any nonsingular covariance matrix by showing how it can be logically designed. One procedure involves inverting the covariance matrix, solving for the eigenvectors and eigenvalues of the inverse matrix, and then taking the product of a matrix formed from the eigenvectors and a diagonal matrix whose elements are the square roots of the corresponding eigenvalues. The product matrix is a whitening filter. (This procedure is well known, but impractical for the implementation of a real time adaptive system.)

It is significant that, although more than one whitening filter corresponding to a specified covariance matrix can be found, there will be only one covariance matrix corresponding to any specific whitening filter. (By correspondence, we mean that when the whitening filter is applied as a linear transformation to variables whose behavior is defined by the covariance matrix, the covariance matrix of the output variables is the identity matrix.)

Now, assuming that a whitening filter $W$ corresponding to the covariance matrix $\Sigma$ has been found, this whitening filter will have the following property:
$$W^T W = \Sigma^{-1} \qquad \text{VIII}$$
To show this, we simply substitute Equation VI into Equation VII. It follows that:
$$\begin{aligned}
E\{W\underline{n}\,\underline{n}^T W^T\} &= 1, \\
W E\{\underline{n}\,\underline{n}^T\} W^T &= 1, \\
E\{\underline{n}\,\underline{n}^T\} &= W^{-1}(W^T)^{-1} = (W^T W)^{-1} \\
W^T W &= E\{\underline{n}\,\underline{n}^T\}^{-1} = \Sigma^{-1}
\end{aligned} \qquad \text{IX}$$

We can now substitute $W^T W$, in place of $\Sigma^{-1}$, in Equation IV. The decision rule is then specified as follows:

It will be decided that a target is present if, and only if,
$$(W\underline{y})^T (W\underline{s}) \geq \tfrac{1}{2}(W\underline{s})^T (W\underline{s}) + \ln[r(1-q)/q] \qquad \text{X}$$

Equation X shows that in order to construct a matched filter corresponding to a colored noise specified by $\Sigma$, it is sufficient to first pass the observation vector $\underline{y}$ through the whitening filter $W$. The matched filter response can be defined by passing the signal vector $\underline{s}$ through the whitening filter $W$. The threshold value specified by the right hand side of the inequality remains unchanged. However, its description has been changed because we wish to show that when $W$ changes with time, the optimum threshold also changes.

It should be noted that, in order to implement the decision rule defined by Equation X, it is unnecessary to construct the time-varying waveform corresponding to the vector $W\underline{y}(t)$. Instead, we can implement the system in the form shown by FIG. 1.

The system shown in FIG. 1 can be simplified by noting that if $W$ is not a time-varying filter, each component of the vector ($W\underline{s}$) is a constant which can be derived. Each derived value can be used to multiply the corresponding value of the time varying vector $[W\underline{y}(t)]$ in a more direct fashion. Also, the threshold will not vary with time, and so additional or separate squaring and summing circuits would not be required.

In FIG. 1, the whitening filters are shown to be variable, and the double arrow drawn between them indicates that the filter at the bottom is slaved to the filter at the top of the figure.

With the foregoing background, now consider the additive noise to be colored Gaussian noise with slowly varying statistical properties. This assumption is representative of any real and practical physical situation where the additive noise contains the type of clutter generated by rain, snow, heavy seas, etc. Since a physical situation of this sort is slowly varying compared to the general time realm of electronic processing, we assume that it is possible to formulate a continuous or sequential estimate of the covariance matrix $\Sigma$, representing the current statistical behavior of the noise. We can then specify a corresponding time-varying whitening filter for the system shown in FIG. 1.

Conceivably, a digital computer can be programmed to form a sequential estimate of this type and to derive a corresponding sequence of whitening filters. However, the process of deriving a whitening filter from a corresponding covariance matrix is extremely tedious. For example, using the process specified in the preceding discussion, the derivation of a whitening filter of dimension eight by eight (for a vector of eight components) requires about 20 minutes of computer operating time on a reasonably large computer. This is far from a real time operation, and the equipment would obviously be rather expensive.

Fortunately, in accordance with the present invention, a much simpler technique for implementing the time-varying whitening filter has been developed. This technique avoids the n relating to derivation of the whitening filter directly from the observed data, and the covariance matrix need not be specified.

The process requires the use of a multiplicity of identical adaptive elements of the form shown in FIG. 2. Each element operates independently on a single variable or function to produce a corresponding output variable or function having unit variance or power. That is, the functional requirement of each element is to multiply its input variable $u(t)$ by a value, which is currently equal to the inverse square root of the variance of $u(t)$.

The reader will recognize that this circuit is equivalent to that of an automatic gain control. The required time constant of the circuit is determined by the rate of change of the statistical behavior of the noise.

The circuit drawn in FIG. 2 is an ideal synthesis of the requirements of the adaptive element. The synthesis is described in the hereinbefore referenced U.S. Pat. No. 3,509,280. Without repeating that synthesis, it should be noted that the value stored in the integrator is the logarithm of a sample variance based on an exponentially weighted history of the square of the input variable.

The adaptive elements are then combined in pairs to form a set of pairwise adaptive transformation elements as shown in FIG. 3. Each transformation operates on a pair of input variables so that the corresponding outputs are normalized (have unit variance or unit average power) and are uncorrelated.

The adaptive transformation elements are then applied to the components of the observation vector $\underline{y}(t)$, as shown in FIG. 4. There is no restriction on the number of input components of the vector $y(t)$ except that which is imposed by the cost of the equipment. Note that the pairwise transformation elements (labeled A) are applied in layers or transformation banks. Each bank of transformation elements ($T_i$) operates on the output of a preceding bank of elements after passing through a permutation operation. The reader is referred again to the aforementioned U.S. Pat. No. 3,509,280 for more information on the practical instrumentation of these permutation operations, and, for that matter, the adaptive whitening filter itself.

Ideally, an infinite number of transformation banks is required for a complete whitening action. One can express the action of this infinite series of operations in terms of a corresponding sequence of covariance matrices, ($\Sigma_1, \Sigma_2, ---$). Each successive element in this sequence represents the covariance matrix of the output of a corresponding bank of transformation elements in the infinite sequence of transformations $\{T_n\}$. By matrix algebra, it can be rigorously proven that the sequence $\{\Sigma_n\}$ converges to the identity matrix as $n$ increases without bound. Furthermore, experimentally, the sequence has been shown to converge extremely rapidly. In practice, completely adequate results are obtained whenever the number of transformation banks used is sufficient so that each output is a linear combination of all input variables. For example, for eight variables three transformation banks are required, for 16 variables four are required, for 32 variables five are required, etc.

A significant feature of the whitening filter is its inherent reliability. If a single adaptive element fails in this system, not only does the system continue to operate, but also, the degradation in performance may not even be unobservably small. In practice, some substantial percentage of the adaptive elements must fail before any degradation in performance is likely to be noticed. This is true because the function of an adaptive element that has failed tends to be "taken over" by elements of succeeding transformation banks.

Referring now to FIG. 1, the matched filter system is shown in overall block form. A sampling circuit 1, responsive to the received radar video return $y(t)$ generating $\underline{y}(t)$ as a vector comprising the plural samples taken, as for example, at the Nyquist rate. It will be noted that there are two whitening filters 2 and 3, both controllable. The filter 2 is operative on the sampled video, and is adaptive as will be understood as this description proceeds, whereas the filter 3 is slaved by a plurality of control signals 4 generated within the circuitry of 2 to slave the filter 3 to 2. Thus, the signal vector $\underline{s}$ (transmitted waveform history) is processed by whitening filter 3 reflecting the adaptive characteristics assumed by 2 in sampling and operating on the $\underline{y}(t)$ observation vector. The signal $y(t)$ is almost entirely noise, since the percentage of time during which a target signal is present therein is comparatively small.

Looking ahead to FIG. 7, the arrangement required to form the square of a vector, as at 6 in FIG. 1, is illustrated. This device operates to form the square of a vector $\underline{v}$ by taking the sum of squares of its component values as is obvious from FIG. 7.

The outputs of whitening filters 2 and 3 are identified as vectors $W\underline{y}(t)$ and $W\underline{s}$, respectively. These are multiplied together vectorially in the multiplier 5 to produce $[W\underline{y}(t)]^T(W\underline{s})$. That expression, along with $W\underline{s}$, may be said to be the adaptive matched filter outputs. As such, these outputs are supplied to a decision circuit in which the cross-multiplied (inner product) output of 5 is compared with the square of $W\underline{s}$ in a threshold detector 7. Here the detection process is comparable to the basic prior art detection, in that a decision, binary or otherwise, is made as to the presence of signal at any sample position (in time). A squaring circuit 6 provides $(W\underline{s})^T(W\underline{s})$ from $W\underline{s}$ and this squared quantity is the decision reference in 7. Stated otherwise, the output of 6 may be thought of as a threshold setting based on the history of the noise.

The generation of the vector $\underline{s}$ is not represented on the drawing, however, it is to be understood to be a known process for generating a history of the known transmitted waveform. A typical instrumentation is illustrated in FIG. 9.6 (Chapter 9) of the Skolnik textbook reference hereinbefore identified.

In describing the elements of the system, it is desirable to look ahead and describe FIG. 4 at this time. In FIG. 4, the vector $\underline{y}(t)$ is shown applied in its individual components $y_1(t), y_2(t)---y_n(t)$, as an input to the whitening filter.

The adaptive whitening filter can, in a sense, be said to "learn" a statistical pattern. FIG. 4 is truncated for simplicity and may actually include more transformation stages than the three shown ($I_1$, $T_2$ and $T_3$). The number of stages vertically is, of course, governed by the value of $n$ (i.e., the number of components in $\underline{y}(t)$). Accordingly, the number of Pairwise Adaptive Transformation Units (labeled A) can be higher than the number illustrated.

The permutation units 44 and 45 are actually merely interconnection units and a set of typical interconnections to facilitate the decorrelation function of the overall whitening filter is indicated in each permutation unit. In this way, successive adaptive Transformation Units operate on different vector component pairs. The nature and logic of this permutation is apparent at 44 and 45 on FIG. 4.

Each transformation bank or stage ($T_1$, $T_2$ or $T_3$) comprises $n/2$ pairwise adaptive transformations with $n/2$ units identified A. Units 32 and 37 are typical of these A units, which are represented in more detail in FIG. 3. Units 34 and 39 are typical of the A units in the second transformation stage ($T_2$) as are 40 and 43 with respect to the $T_3$ stage.

Referring now to FIG. 3, the inputs $u_1(t)$ and $u_2(t)$ will be either the initial inputs at FIG. 4 or the permuted signals from 44 or 45. The block 17 is a transformation occurring logically as indicated by the symbols within 17. Referring to FIG. 3a, one particular way of accomplishing this transformation function is illustrated using transformers. In that instrumentation, two transformers 24 and 25 have parallel, in-phase excited primaries 26 and 27. Secondaries 28 and 30 are connected in series aiding while secondaries 29 and 31 are in series bucking (subtractive). The outputs 18 and 19 are therefore comparable to those leads in FIG. 3. The adaptive elements 20 and 21 complete the function of this sub-unit to provide the outputs at 22 and 23 in the mathematical context given on FIG. 3.

Referring now to FIG. 2, the detailed instrumentation of these adaptive elements will be described. The multiplying element 8 is a typical variable gain device of gain $a$, whereby the output 9 is a controllable fraction of the $u(t)$ input in accordance with the control input at 16. The feedback control loop generating this control signal at 16 begins by squaring the signal at 9 in a squaring circuit 11. Next, an adder 12 adds $-1$ to the squared signal from 9. The mathematical descriptions of all the operations in this feed loop are as indicated on FIG. 2.

To continue, the adder 12 output is passed through a variable gain circuit 13 (a multiplier in a mathematical sense). Here the scale factor $\Delta$ may be adjusted. The entire circuit of FIG. 2 being recognizable as a type of AGC circuit, it will be realized that the gain $\Delta$ at 13 is a predeterminable scale factor which operates to control the time constant or responsiveness of the loop. The integrator 14 may be as simple as a series RC circuit. The exponentiation circuit 15 takes the output of integrator 14 and applies it to an exponentially responsive amplifier, so that the signal 16 is actually the value of the gain coefficient $a$.

In practice, both the exponentiation operation and the variable gain operation are accomplished by the type of circuit shown in FIG. 6. Referring to this figure, a transistor 50 is operated in the common emitter mode, with the output signal taken from the collector load resistor 51 at 58 (the lead 16 signal from FIG. 2). The transistor base 49 is suitable biased (not shown) in accordance with well known circuit design criteria. The signal 57 is applied to emitter resistor 52 via an isolation capacitor 53 and a varistor divider network 55 and 54. These varistors are known for their exponential current versus applied voltage characteristic, used in this case to develop the exponentiation function referred to hereinbefore. Capacitor 56 is shown only as a possible form of the integrator 14. In that case, capacitor 56, together with the output resistance of 13, provide the integration required.

Referring now to FIG. 5 and back to FIG. 1, the slaving of the whitening filter 3 to 2 will be explained. The circuit of FIG. 2 is shown for purposes of explanation of the design of its feedback loop, however, the application of the circuit is actually as shown on FIG. 5. On that figure, the feedback components 10 are as indicated and described on FIG. 2. Another variable gain element 46 is indicated however. This additional element 46 is controlled in open-loop fashion, as contrasted to the closed-loop control applied to 8. It will be noted on FIG. 4 that control inputs 36, 37, 38, 39, 42, and 43 are illustrated corresponding to pairwise adaptive transformation units 32, 33, 34, 35, 40, and 41. These leads are double arrowed since they are outgoing control functions from these A units in the adaptive whitening filter 2 and incoming control functions to the A units in the slaved whitening filter 3. Further, the A units (FIG. 4) comprise only the controllable element 46 when we are speaking of the slaved whitening filter 3. The output 48 and the input 59 in that case are the output and input of each slaved A unit. The control link 60 is included in the group of leads 4 (FIG. 1).

The instrumentation of those elements not described in detail will be evident from their functional description to those skilled in this art, once the broad principles of the invention are understood. Other elements illustrated are capable of being instrumented in ways other than those shown and described. It will occur to the skilled practitioner in this art that partial or total digital instrumentation of the system of the present invention is possible. For example, the sampling device 1, which in its purely analog form would be expected to comprise a number of delay lines to produce the analog components of the $y(t)$ vector, could be instrumented by digital sampling of $y(t)$ at the Nyquist rate and applying the samples to shift registers. Each register then would hold a digital word representing a component of a vector in a sequence of vectors.

An example of partial digital implementation would be the feedback loop of FIG. 2. Such an approach would involve digital mathematical operations represented in the loop from digitally coded samples taken at 9 at the Nyquist rate for $u(t)$. Accordingly, it is not intended that the present invention should be considered limited by the drawings and description, which are illustrative only.

What is claimed is:

1. In a radar equipment including pulsed radar transmitting and receiving means, a system for enhancing the detectability of pulsed received signals in colored noise comprising:

sampling means operating at a predetermined repetition rate and sample duration for sampling the received signal and noise to produce a plurality of successive samples comprising a vector $\underline{y}(t)$;

a first whitening filter responsive to said $\underline{y}(t)$ signals for processing said samples, said first whitening filter comprising a separate channel for each signal component of said vector, said channels each including a plurality of cascaded automatic amplitude control circuits, thereby being adaptive to the statistical characteristics of noise in said $\underline{y}(t)$ signals;

a second whitening filter responsive to second samples characterizing the transmitted waveform shape, said second whitening filter comprising a plural automatic amplitude control means controlled by the corresponding means in said first whitening filter, thereby to slave said second whitening filter to the adaptive characteristics of said first whitening filter;

analog multiplying means for individually multiplying the vector components of the output of said first whitening filter by the corresponding vector components of the output of said second whitening filter to produce a whitened product vector signal;

and threshold means for detecting useful signals within said whitened product vector signal exceeding the amplitude threshold formed by said second whitening filter output vectors.

2. The invention according to claim 1 including squaring means responsive to the vector components of said second whitening filter for generating a corresponding set of squared vector components, said squaring means being connected between said second whitening filter output vectors and said threshold means, whereby said squaring means output becomes the reference for said threshold means.

3. The invention set forth in claim 2 in which said whitening filters each include a pairwise transformation unit connected to each pair of components in said $\underline{y}(t)$ vector, said transformation units each having two outputs and being adapted to provide the sum of the signals on said input pair on one of said outputs and the difference of the signals on said input pair at the other of said outputs, said outputs each including one of said cascaded automatic amplitude control circuits in series therewith.

4. The invention set forth in claim 3 in which said automatic amplitude control circuits include a controllable variable gain element in series with each output of said pairwise adaptive transformation units, and a control loop responsive to the output of said variable gain element to produce and apply a control signal to said variable gain element in a manner so as to regulate the output amplitude of said variable gain element at a predetermined level.

5. Apparatus according to claim 4 in which said control loop comprises at least a squaring circuit responsive to the output of said variable gain element, an integrator responsive to the output of said squaring circuit and an exponential response circuit to produce said control signal in the form of the natural log of the effective gain of said variable gain element.

6. Apparatus according to claim 5 in which said control loop includes a predeterminable gain element ahead of said integrator, thereby to provide adjustment of the time constant of response of said automatic amplitude control circuits.

7. Apparatus according to claim 4 in which the outputs of said pairwise transformation units of said second whitening filters are fed to cascaded automatic amplitude control circuits comprising said controllable variable gain elements, and said variable gain elements are each responsive to said control signals generated in corresponding automatic amplitude control circuits of said first whitening filter.

* * * * *